J. E. BOEGEN.
STEAM, AIR, AND WATER TRAP VALVE.
APPLICATION FILED MAR. 7, 1910.
974,100.
Patented Oct. 25, 1910.
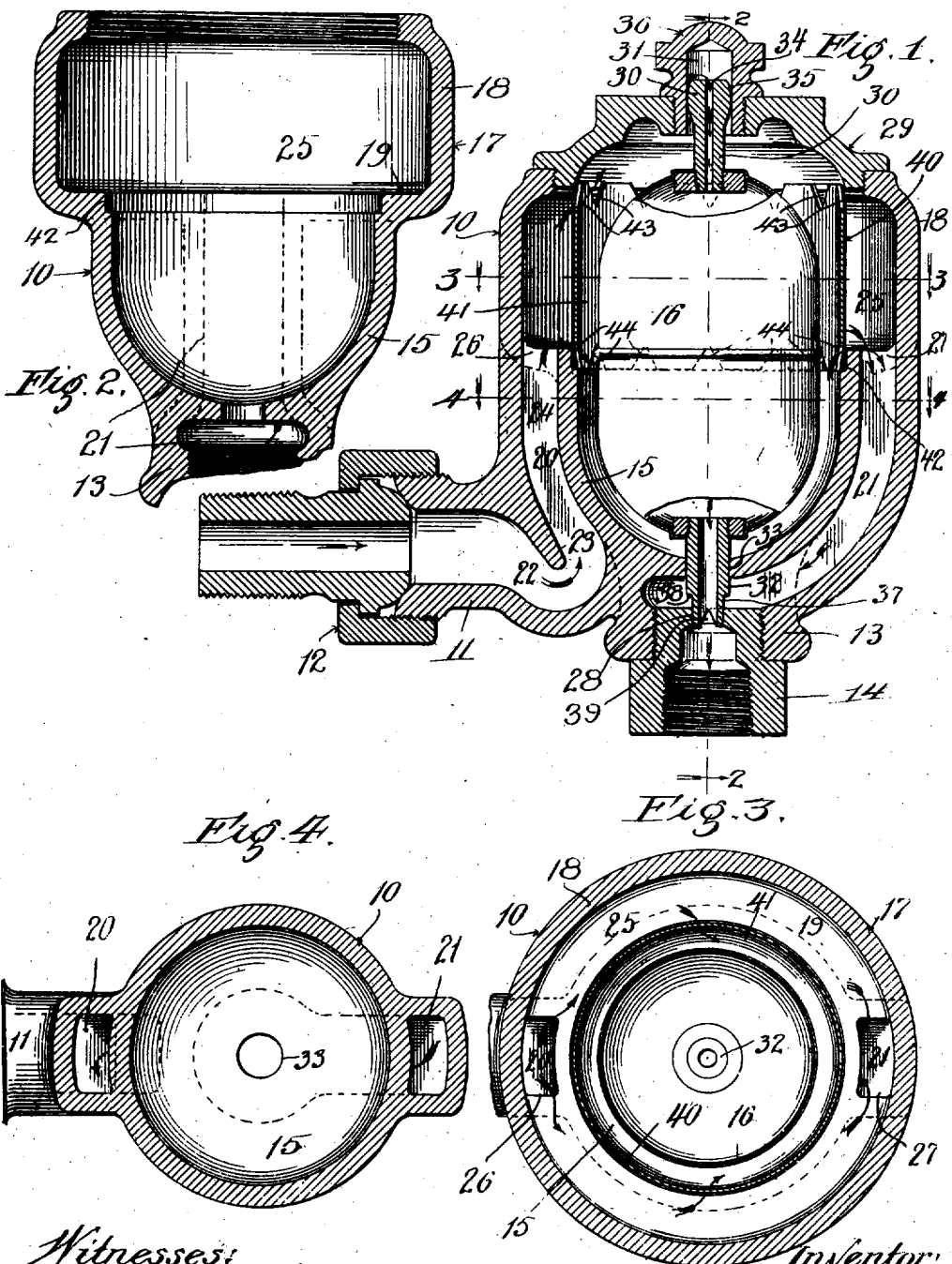
Witnesses:
Inventor:
John E. Boegen,
by Charles O. Sherwey

UNITED STATES PATENT OFFICE.

JOHN E. BOEGEN, OF BERWYN, ILLINOIS, ASSIGNOR TO IROQUOIS ENGINEERING COMPANY, OF CHICAGO, ILLINOIS, A CORPORATION OF ILLINOIS.

STEAM, AIR, AND WATER TRAP VALVE.

974,100.  Specification of Letters Patent.  Patented Oct. 25, 1910.

Application filed March 7, 1910. Serial No. 547,632.

*To all whom it may concern:*

Be it known that I, JOHN E. BOEGEN, a citizen of the United States, residing at Berwyn, in the county of Cook and State of Illinois, have invented new and useful Improvements in Steam, Air, and Water Trap Valves, of which the following is a specification.

This invention relates to steam, air, and water trap valves, and is designed more particularly for use in vacuum heating systems.

Valves of this type are placed on the discharge end of radiators or other heating coils for the purpose of discharging the air and water of condensation therefrom and one of the objects of this invention is to provide a valve of improved construction for accomplishing this purpose.

Another object is to provide the means for minimizing noise caused by the pounding of the valve stem and the rattling of the float which is usually attended in valves of this class.

Another object is to prevent the accumulation of grease and oils about the float, valve stem and ports.

Another object is to simplify the construction, and to construct the device so that the interior thereof may be made readily accessible for the purpose of cleaning or repairing.

Another object is to provide means whereby the float may be wholly inclosed within a float chamber which communicates with an outer chamber through a series of apertures arranged along the line of flotation for the passage of water and with said outer chamber at the upper end by a series of apertures through which air may pass on its way to the discharge end of the device.

Other objects and advantages will appear and to such ends this invention consists in the several novel features of construction, arrangement and combination of parts hereafter wholly set forth in this specification and particularly pointed out in the claims.

The invention is illustrated in the drawing furnished herewith in which:—

Figure 1 is a central, vertical, section through the device, Fig. 2 is a central, vertical, cross section of the casing alone taken on the line 2—2 of Fig. 1, Fig. 3 is a horizontal section taken on the line 3—3 of Fig. 1, Fig. 4 is a horizontal section of a casing alone taken on the line 4—4 of Fig. 1.

In these views, 10, represents the casing, which is provided near its lower end with a laterally extending nipple 11, that is provided with a coupling 12, by means of which it may be attached to a radiator. The lower end of the casing 10, is formed with a downwardly opening neck 13, into which is screwed a fitting 14, by means of which the device is connected to the return pipe of the system. Said fitting contains a discharge aperture 28, and acts as a seat for a valve stem as hereafter described.

The casing comprises in general, two main sections, one located above the other, one section being in the form of an inverted dome adapted to act as a float bowl 15, for the float 16. The upper section 17, of the casing is of a greater diameter than the float bowl 15, and a horizontally extending ledge 19, joins the lateral wall 18, thereof with the upper marginal edge of the float bowl 15. Said ledge is preferably located at or immediately below the line of flotation, the purpose of which will appear later on.

The casing is cast with two passageways 20, 21, in its side wall, one of which (20) is the inlet passage for the air, steam and water of condensation and leads in from the nipple 11, and through a goose-neck passage 22, having a downwardly projecting tongue 23, therein underneath which the water must flow before rising in the upright portion 24, of the inlet passage. Said passage opens into an annular chamber 25, in the upper section of the casing through a port 26, in the ledge 19, and consequently on or just below the line of flotation. The passageway 21, is the discharge passage and leads from said chamber 25, through a discharge port 27, in the ledge 19, and down to a point below the float bowl 15, where it connects with a discharge aperture 28, in the fitting 14. The upper end of the casing has a screw threaded opening through which the float and other parts may be inserted into the casing, and said opening is closed by a cover 29, screwed into the same.

The float 16, comprises a hollow shell and is guided to move in a vertical line, as for instance by a guide pin 30, at its upper end, which slides in a recess 31, and a valve stem 32, which extends through an opening 33, in the lower end of the float bowl and slides in the discharge aperture 28, in the fitting 14. The pin 30, is preferably constructed with an air vent 34, leading from the recess 31, to the interior of the float 16, and has a ball shaped head 35, which fits loosely in the recess 31, so that air may pass around said head and through the vent 34. If desired a separate cap 36, may be secured into an opening in the cover 29, and the recess 31, formed in said cap.

The valve stem 32, is tubular in form and rigidly secured to the float. It is formed with a reduced portion 37, to provide a shoulder 38, which at certain times, (as for instance when the bowl is free of water) seats on the upper face of the fitting 14, but it does not seat thereon so long as the float is buoyed up by the water in the float bowl. A lateral port 39, is provided for establishing communication between the discharge passage 21, and the discharge aperture 28, and as shown said port is formed in the wall of the reduced portion 37, of the valve stem by making a notch in its lower end. The arrangement of the parts is such that said port 39, remains closed to prevent the escape of water, until the water in the float bowl raises the float sufficiently to bring the upper edge of the port 39, above the top of the fitting 14. This takes place whenever the water in the casing rises to the line of flotation which as heretofore stated, is just at or immediately above the ledge 19. I aim to have the apex of the notch 39, reach the upper face of the fitting 14, when the level of the water reaches the line of flotation. If the water in the casing rises faster than it is discharged, the float is correspondingly raised, uncovering more of the port 39, and permitting the water to escape more freely. In case there is a sudden inrush of water, the valve stem will be lifted clear of the discharge aperture 28, thereby uncovering the entire aperture and allowing the water above the bowl to be readily discharged. In case the water in the bowl seeps through the space between the wall of the opening 33, and the valve stem, faster than it accumulates in the bowl, then the float will gradually settle until the shoulder 38, seats on the top of the fitting 14. This action occurs principally when the steam is shut off from the radiator, but in operation the bowl usually remains full so that the float is cushioned by the water therein, and inasmuch as the discharge port 28, is closed by the sliding down of the valve stem in the discharge aperture until the notch is covered, no shock or jarring is possible, whereby the noise at this point is wholly eliminated.

Extending up from the top of the float bowl to the cover is a cylindrical wall 40, which, together with the cover and bowl, wholly inclose the float 16, in a chamber 41, which may be termed the float chamber. In the preferred form of construction, the inner edge of the ledge 19, is rabbeted out to form a seat 42, for the wall 40. The wall contains apertures 43, for the passage of air and steam, and apertures 44, for the passage of water to and from the float chamber 41. I have found it desirable to place the apertures 43, at the upper edge of the wall 40, and the apertures 44, at the line of flotation and have made a loose fit between the lower edge of the wall and the ledge so that the water may leak through the apertures. An annular chamber 25, is thus formed between the walls 18, 40, which chamber is located wholly above the line of flotation, and has a greater diameter than the float bowl, into which any sudden inrush of water must first pass before entering the float chamber. The wall 40, thus operates to shield the float from the impact of the inrushing water, thereby preventing any rattling or wabbling of the float. The water rushing into the annular receiving chamber flows around on the ledge and through the apertures 44, in the wall 40, raising the float and consequently uncovering the discharge port 39.

In operation the nipple 11, of the valve is connected to the discharge end of a radiator or other heating coil and the fitting 14, connected to the return pipe of the system. The air is forced or drawn out of the radiator with the entrance of steam, and as the latter condenses, the water of condensation flows into the inlet passage 20. The differential pressure on the inlet and discharge ends of the valve causes the water of condensation to rise in the upright portion 24, of the inlet opening, flow over the ledge 19, through the apertures 44, in the wall 40, and into the bowl 15, the air having been drawn through the recess 31, vent 34, hollow float 16 and air passage in the tubular valve stem 32. When the water rises above the line of flotation in the bowl the float is raised sufficiently to uncover the port 39, and the water above said line discharged, at which time the port will again have been covered. Any sudden inrush of water will be received by the annular chamber above the float line, and as soon as sufficient water flows into the float chamber to raise the float, the discharge port is opened. Should the water in the float chamber rise sufficiently to lift the float far enough to raise the valve stem out of the discharge aperture, a much larger opening is presented thereby preventing the excess amount of water to freely escape.

It is evident that any oil or grease which may enter the annular chamber will float on the surface of the water and be discharged as soon as the float rises to uncover the discharge port. Furthermore, by arranging the fitting 14, to be screwed into the neck from below, it may be readily unscrewed for the removal of any accumulation of large foreign particles or sediment, should any such accumulation occur.

I realize that various alterations and modifications of this device are possible without departing from the spirit of my invention, and I do not therefore desire to limit myself to the exact form of construction shown and described.

I claim as new and desire to secure by Letters Patent:

1. In a valve of the class described, the combination with a valve casing having a central float chamber which is closed at its bottom, and an annular chamber in direct communication therewith and surrounding the same solely above the line of flotation, said casing being provided with inlet and discharge passages opening into said annular chamber, of a float within the float chamber having a valve for controlling the discharge passage and being provided with an air discharge passage communicating with said annular chamber.

2. In a valve of the class described, the combination with a valve casing having a central float chamber, and an annular chamber in communication therewith, and surrounding the same solely above the line of flotation, said casing being provided with inlet and discharge passages opening into the annular chamber approximately on a level with the line of flotation, of a float within said float chamber having a valve stem for controlling the discharge passage and being provided with an air discharge passage communicating with said annular chamber.

3. In a valve of the class described, the combination with a valve casing having a central float bowl, a chamber above the same of greater diameter than the float bowl, and inlet and discharge passages leading to said upper chamber, of a perforated cylindrical wall extending upward from the float bowl to provide an annular chamber in said chamber of greater diameter which is in communication with the interior of the chamber within the cylindrical wall, and a float in said float bowl having a valve stem for controlling the discharge passage, and being provided with an air discharge passage communicating with the chamber of greater diameter.

4. In a valve of the class described, the combination with a valve casing provided with a float chamber having a closed bottom, and inlet and discharge passages communicating with the float chamber, said discharge passage leading to a vertical discharge aperture below the float chamber, of a float in the float chamber having a valve stem projecting into the discharge aperture to close the same, and having a downwardly flaring port in its side which extends up from its lower edge, said float operating when lifted sufficiently by the rise of water in the float chamber, to wholly withdraw the valve stem from the discharge aperture substantially as and for the purpose set forth.

5. In a valve of the class described, the combination with a valve casing having a float chamber, closed at the bottom, and inlet and outlet passages communicating therewith, said discharge passage leading below the float chamber and terminating in a vertical discharge aperture, of a float guided in said float chamber and actuated by the rise and fall of water in the float chamber to rise and fall therewith, and a valve stem secured to the float and projecting down through a central opening in the bottom of the float chamber and closing the same, and sliding in and out of said discharge aperture to wholly close and open the same, said valve stem being provided with a lateral port at its lower end for affording a restricted discharge port when said valve stem is raised slightly from the closed position.

6. In a valve of the class described, the combination with a valve casing having a float chamber and inlet and discharge passages, said discharge passage leading to a discharge aperture below the float chamber, of a float in the float chamber having a valve stem provided with a downwardly flaring port which extends up from its lower edge in its side, and sliding in said discharge aperture, said port being adapted to establish communication between the discharge passage and discharge aperture when the float is lifted by the rise of the water to a predetermined level in the float chamber.

7. In a valve of the class described, the combination with a casing having a float chamber, an annular chamber located above the line of flotation, and in communication with the float chamber, and inlet and discharge passages opening into the annular chamber, of a float in the float chamber having a tubular valve stem sliding in and normally closing the discharge port of the discharge passage, said valve stem having a downwardly flaring port in its side which is adapted to be uncovered by the upward movement of the float and valve stem.

8. In a valve of the class described, the combination with a valve casing having a float chamber, an annular chamber located above the line of flotation and in communication with the float chamber, inlet and discharge passages opening in the annular chamber, and a fitting having a discharge aperture opening out from the discharge passage, of a float in said float chamber, a valve stem carried thereby and having a reduced portion sliding in the discharge aperture of the fitting to close the same, said reduced portion having a lateral port arranged to be exposed when the float and valve stem are raised above a certain predetermined position.

9. In a valve of the class described, the combination with a valve casing having a float chamber, closed at the bottom, and inlet and discharge passages communicating therewith, approximately at the line of flotation, said discharge passage terminating in a discharge aperture below the float chamber, of a hollow float having an air vent in its upper end; and being normally suspended by water in the float chamber, a tubular valve stem carried by said float and projecting down through an opening in the bottom of the float chamber and closing the same, the lower end of said valve stem being arranged to move in and out of said discharge port, and having a downwardly flaring lateral port, extending up from its lower edge, which port is wholly covered by the surrounding wall of the discharge aperture when the level of the water in the float chamber is on the line of flotation, but which becomes uncovered gradually as the float begins to rise with the water in the float chamber, whereby the valve constantly discharges water of condensation as the steam condenses in the radiator, said float being capable of rising sufficiently to wholly withdraw the valve stem from the discharge aperture.

10. In a valve of the class described, the combination with a casing having a float chamber, closed at the bottom, an inlet passage to the float chamber and a discharge passage from the float chamber, terminating below the same, said casing being provided with a neck, formed integral therewith, and opening down from the discharge passage, of a tubular fitting adapted for connection with a return pipe and being screwed into said neck from below, said fitting having a discharge aperture in its upper end opening directly into the discharge passage of the casing, a float in the float chamber and a valve stem carried by said float and projecting down through an opening in the bottom of the float chamber and closing the same, the lower end of said stem sliding in and out of said discharge aperture in the fitting and having a lateral port at its lower end which is uncovered by the rise of the float from its normal position of flotation.

In witness whereof, I have hereunto set my hand at Chicago, Cook county, Illinois, this 5th day of March 1910.

JOHN E. BOEGEN.

Witnesses:
CHARLES O. SHERVEY,
FANNIE F. RICHARDS.